United States Patent
Wu et al.

(10) Patent No.: US 12,452,702 B2
(45) Date of Patent: Oct. 21, 2025

(54) ADAPTIVE UE CAPABILITY MESSAGE COMPACTION

(71) Applicant: GOOGLE LLC, Mountain View, CA (US)

(72) Inventors: Meng-Hau Wu, Hsinchu (TW); Xu Ou, San Jose, CA (US); Yu-Cheng Chen, Hsinchu (TW); Rukun Mao, Santa Clara, CA (US); Zong Syun Lin, Hsinchu (TW); Qin Zhang, Mountain View, CA (US); Yi-Hua Li, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 360 days.

(21) Appl. No.: 18/018,954

(22) PCT Filed: Aug. 6, 2020

(86) PCT No.: PCT/US2020/045420
§ 371 (c)(1),
(2) Date: Jan. 31, 2023

(87) PCT Pub. No.: WO2022/031296
PCT Pub. Date: Feb. 10, 2022

(65) Prior Publication Data
US 2023/0292149 A1 Sep. 14, 2023

(51) Int. Cl.
*H04W 24/02* (2009.01)
*H04L 5/00* (2006.01)
*H04W 16/24* (2009.01)

(52) U.S. Cl.
CPC ............ *H04W 24/02* (2013.01); *H04L 5/001* (2013.01); *H04W 16/24* (2013.01)

(58) Field of Classification Search
CPC ....... H04L 5/001; H04L 5/005; H04L 5/0092; H04L 5/0051; H04L 2012/6486;
(Continued)

(56) References Cited

U.S. PATENT DOCUMENTS 9,002,015 B2 * 4/2015 Fong ..................... H04W 72/23
455/73
9,775,077 B2 * 9/2017 Yang .................. H04W 36/0072
(Continued)

FOREIGN PATENT DOCUMENTS

WO 2020077230 A1 4/2020

OTHER PUBLICATIONS

Translation of Indian Examination Report mailed on Oct. 9, 2024 for Indian Application No. 202347006720, 5 pages.
(Continued)

*Primary Examiner* — Jung Liu (57) ABSTRACT

A UE performs up to a threshold number of attempts to transmit a default capability message to a base station, the default capability message representing a default set of CA combinations supported by the UE. If transmission is unsuccessful, the UE switches to a compact capability mode in which the UE attempts to transmit compacted UE capability messages representing successively smaller subsets of the default set of CA combinations until either a capability message is successfully received by the base station or a second threshold number of unsuccessful transmission attempts is performed. To facilitate configuration of an initial compacted capability message, the UE maintains a PC list that lists one or more cells that have been identified previously as incapable of receiving default-sized capability messages and that further identifies a representation of a limited subset of CA combinations to include in capability messages sent to a corresponding listed cell.

23 Claims, 3 Drawing Sheets

(58) Field of Classification Search
CPC .... H04B 1/0053; H04W 76/18; H04W 24/10; H04W 24/04; H04W 48/02; H04W 76/19; H04W 76/15; H04W 88/06; H04W 88/02; H04W 8/24; H04W 48/18; H04W 60/04
See application file for complete search history.

(56) References Cited

U.S. PATENT DOCUMENTS

| | | | | |
|---|---|---|---|---|
| 12,028,881 | B2* | 7/2024 | Fakoorian | H04L 5/0092 |
| 2015/0351061 | A1 | 12/2015 | Kim et al. | |
| 2016/0073302 | A1* | 3/2016 | Yang | H04W 36/0072 370/331 |
| 2016/0081076 | A1 | 3/2016 | Zhang et al. | |
| 2017/0367073 | A1* | 12/2017 | Murugan | H04L 5/001 |
| 2019/0150031 | A1* | 5/2019 | Balasubramanian | H04W 36/0022 370/329 |
| 2021/0045177 | A1* | 2/2021 | Lee | H04W 76/18 |
| 2023/0069144 | A1 | 3/2023 | Wang | |

OTHER PUBLICATIONS

Summarized Translation of the First Office Action mailed on Oct. 28, 2024 for Chinese Application No. 202080104209.6, 16 pages.
International Search Report and Written Opinion mailed Apr. 29, 2021 for International Application No. PCT/US2020/045420, 16 pages.
English Translation of Taiwanese Office Action mailed May 3, 2022 for TW Application No. 110128842, 7 pages.
3GPP TS 25.331 v16.0.0 Release 16; "3rd Generation Partnership Project; Technical Specification Group Radio Access Network; Radio Resource Control (RRC); Protocol Specification"; Apr. 2, 2020; 8 pages.
3GPP TS 31.102 version 15.3.0 Release 15; "Universal Mobile Telecommunications System (UMTS); LTE; Characteristics of the Universal Subscriber Identity Module (USIM) Application"; ETSI TS 131 102 v15.3.0; Apr. 2019; 312 pages.
3GPP TS 37.873 V16.0.0 Release 16, "3rd Generation Partnership Project; Technical Specification Group Radio Access Network; NR and Evolved Universal Terrestrial Radio Access (E-UTRA); Study on optimizations of UE radio capability signalling"; Apr. 14, 2019; 16 pages.
3GPP TSG-RAN WG2 Meeting #103; "Handling of UE for the Camping Cell with Unsupported Bandwidth," R2-1811228; Gothenburg, Sweden; Aug. 20, 2018; 2 pages.
Huawei et al., "UE CA Capability Signalling for B5C"; 3GPP Draft; R2-1554340; 3GPP TSG-RAN WG2 #91bis; URL: http://www.3gpp.org.ftp/Meetings_3GPP_SYNC/RAN2/DOCs/; Oct. 5-9, 2015; 5 pages.
Intel Corporation, "Reduction of LTE UE Capability Signaling Size," 3GPP Draft; R2-167777; 3GPP TSG-RAN WG2 Meeting #96; URL: http://www.3gpp.org.ftp.tsg_ran/WG2_RL2/TSGR2_96/Docs/; Nov. 5, 2016; 3 pages.
International Preliminary Report on Patentability mailed Feb. 16, 2023 for PCT Application No. PCT/US2020/045420, 9 pages.
Summarized Translation of the Second Office Action mailed Apr. 11, 2025 for Chinese Application No. 202080104209.6, 25 pages.
Translation of Chinese Notification for Patent Registration Formalities mailed Jul. 8, 2025 for Chinese Application No. 202080104209.6, 5 pages.

* cited by examiner

ADAPTIVE UE CAPABILITY MESSAGE COMPACTION

CROSS-REFERENCE TO RELATED APPLICATIONS

The present application is a U.S. National Stage Application under 35 U.S.C. § 371 of International Patent Application Serial No. PCT/US2020/045420, entitled "ADAPTIVE UE CAPABILITY MESSAGE COMPACTION" and filed on Aug. 6, 2020, the entirety of which is incorporated by reference herein.

BACKGROUND

When establishing a connection between a mobile wireless device or other user equipment (UE) and a serving cell of a wireless network, the UE and a base station of the cell engage in a capability transfer procedure in which the base station transmits an enquiry as to the capabilities of the UE (often referred to in various cellular specifications as a UECapabilityEnquiry message) and the UE replies with a response that summarizes the relevant capabilities of the UE (this message often referred to in various cellular specifications as a UECapabilityInformation message). Assuming successful receipt of the UECapabilityInformation message at the base station, the base station configures the air interface between the UE and the base station in accordance with the identified capabilities.

Some wireless network protocols, such as the Fourth Generation (4G) Long Term Evolution (LTE) Advanced (LTE-Advanced) protocols and the Fifth Generation (5G) New Radio (NR) protocols promulgated by the Third Generation Partnership Project (3GPP), employ carrier aggregation (CA) in which two or more individual carriers (each referred to as a "component carrier" or "CC") are aggregated to provide an aggregated bandwidth with a higher bit rate. In situations in which both the UE and the network support carrier aggregation, the UE capability information transmitted from the UE to the base station includes a list or other representation of the particular CA combinations that the UE is capable of supporting. As wireless protocols have developed, the number of possible CA combinations has increased significantly. For example, LTE-Advanced supports aggregation of up to 5 component carriers in any given CA combination, while 5G NR supports up to 16 component carriers in any given CA combination. Dual Connectivity (DC) mode in 5G NR further increases the CA combination complexity as it allows carrier aggregation of both LTE and 5G NR component carriers.

This increasing number of possible CA combinations supported by a UE has led to a commensurate increase in the size of the UE capability message sent from the UE to the base station—originally sized at tens of bytes prior to CA implementation and now up to tens of kilobytes in current implementations utilizing CA in 5G, and with further increases in size as CA techniques continue to be developed. This significant increase in size of the UE capability message puts the UE capability message at risk of not being successfully received by the base station. In some instances, the base station may not be configured to accept a UE capability message of the size necessary to represent the entirety of the CA capabilities of the UE. In other instances, the base station may be able to handle the size of such a UE capability message, but the uplink channel conditions may prevent complete transmission of the UE capability message in the time allotted for transmission of this message (e.g., 5 milliseconds in some wireless specifications). When the base station does not successfully receive a UE capability message following a UE capability enquiry, the base station will release the UE right after the UE capability transfer procedure. The UE and base station will repeat this setup-and-release scenario until a threshold number of failed transmission attempts is reached, at which point the UE will block the radio access technology (RAT) associated with the cell (typically by barring further attempts to connect) and fall back to utilizing a legacy RAT instead.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

SUMMARY OF EMBODIMENTS

In the examples described herein, a UE performs up to a threshold number of attempts to transmit a default capability message to a base station, the default capability message representing a default set of CA combinations supported by the UE. If transmission is unsuccessful, the UE switches to a compact capability mode in which the UE attempts to transmit compacted UE capability messages representing successively smaller subsets of the default set of CA combinations until either a capability message is successfully received by the base station or a second threshold number of unsuccessful transmission attempts has been performed. To facilitate configuration of an initial compacted capability message, the UE maintains a PC list that lists one or more cells that have been identified previously as incapable of receiving default-sized capability messages and that further identifies a representation of a limited subset of CA combinations to include in capability messages sent to a corresponding listed cell.

In a first aspect, a method for capability transfer by a user equipment (UE) in a cellular network is provided, the method comprising: in a first mode, attempting to transmit capability messages representing successively smaller subsets of a set of carrier aggregation (CA) combinations from the UE to a base station of a serving cell of the cellular network until either a capability message is successfully received by the base station or a first threshold number of unsuccessful attempts to transmit a capability message has been performed.

Connection between a mobile wireless device or other user equipment (UE) and a serving cell of a wireless network may therefore be improved by compensating for problematic cells. Bandwidth and network usage may also be reduced during the connection process by sending successively smaller capability messages.

Optionally, the method further comprises, in a second mode prior to the first mode, attempting to transmit capability messages representing the set of CA combinations from the UE to the base station until a second threshold number of unsuccessful attempts to transmit a capability message have been performed; and entering the first mode responsive to the second threshold number of unsuccessful attempts having been performed.

In a second aspect, a method for capability transfer by a user equipment (UE) in a cellular network is provided, the method comprising: maintaining, at the UE, a problematic cell list identifying one or more cells previously identified as failing to receive a capability message of a default size, the problematic cell list further identifying at least one of a corresponding maximum number of component carriers for each listed cell or a specific subset of carrier aggregation (CA) combinations; and responsive to determining that a base station of a serving cell is incapable of receiving a capability message representing a set of CA combinations supported by the UE: determining whether the serving cell is listed in the problematic cell list; and responsive to determining the serving cell is listed, attempting to transmit a capability message representing a subset of CA combinations from the UE to the serving cell, the subset of CA combinations composed of: only CA combinations from the set that have a number of component carriers not greater than the maximum number of component carriers identified in the problematic cell list for the serving cell; or the specific subset of CA combinations.

DETAILED DESCRIPTION

A frequent approach of a UE attempting to repeatedly transmit a default set of CA combinations in a UE capability message to a base station of a serving cell that is incapable of receiving a UE capability message of the size needed to include this default set of CA combinations (due to UL conditions or the configuration of the base station itself) typically leads to the UE defaulting to another RAT with lower performance capabilities after a succession of failed transmission attempts. To avoid such situations, systems and techniques are described herein for the adaptive sizing of the UE capability message using an iterative compaction approach to better ensure successful receipt of a UE capability message by the base station of a serving cell. This technique is based on increasingly-aggressive filtering of CA combinations to be included in the UE capability message based on observed performance of previous attempts to transmit UE capability messages to the base station using less-restricted sets of CA combinations. Connection between a mobile wireless device or other user equipment (UE) and a serving cell of a wireless network may therefore be improved.

In at least one embodiment, the UE employs a set of lists, including a problematic cell (PC) list (a first list) and a network maximum CC list (a second list). The PC list includes cells of the network that have been previously identified (by the UE or other network entity) as a "problematic cell" in that the base station of that cell was found to be previously incapable of receiving a UE capability message of a default size, such as a size sufficient to represent the entirety of the set of CA combinations supported by the UE. The PC list further includes corresponding information indicating an associated representation of a limited subset of CA combinations for the corresponding cell, wherein this information can indicate a size, or degree of compactness, that should be implemented in the CA capabilities sent in a UE capability message to the corresponding base station for the listed cell. This representation of the limited subset of CA combinations can include, for example, a representation of the maximum CC combination size that should be included in the UE capability message, specification of a particular reduced subset set of CA combinations, or a combination thereof. The network maximum CC list is utilized to identify a network-specific CA combination configuration that represents a limited subset of CA combinations to be implemented for an associated network, whether as a maximum CC combination size for a given network (e.g., a given public land mobile network (PLMN)) or a particular subset of CA combinations, that can be implemented as a starting point for the adaptive UE capability sizing process.

In response to a UE capability enquiry message from a base station when the UE first camps on a serving cell associated with that base station, the UE transmits a UE capability message with a default set of CA combinations. This default set can represent the entirety of the set of CA combinations supported by the UE, or a subset of the entirety filtered based on, for example, the known CA capabilities of the mobile network operator (MNO) or mobile country code (MCC) associated with the network. In the event that the base station of the serving cell successfully receives the UE capability message and does not release the UE in response, the UE and base station cooperate to set up an air interface based on the advertised capabilities, including the advertised CA capabilities. Further, if the serving cell was previously identified as a problematic cell on the PC list, the UE removes the serving cell from the PC list to reflect the recent successful attempt to transmit the full-size UE capability message to the base station of the serving cell.

However, if the base station is unable to successfully receive the full-sized UE capability message after a first threshold number ($X>=1$) of attempts during a normal capability mode, then the UE switches to a compact capability mode and implements a UE capability information compaction process while in this mode. In this process, the UE initially accesses the PC list to determine if the cell has already been identified as a problematic cell. If so, the UE accesses the compact CA combination information associated with the cell in the PC list and generates a compact UE capability message to include an initial subset of the set of CA combinations based on this compact CA combination information. Otherwise, if the cell is not present in the PC list, the UE instead uses the PLMN identifier (ID) or other network ID to access a network-specific CA combination configuration for the corresponding network from the network max CC list, and then generates a compact UE capability message based on this network-specific CA combination configuration. The UE then attempts to transmit the compacted UE capability message to the base station. If successfully received at the base station, the UE and base station can establish an air interface based on the capabilities advertised in the compact UE capability message.

Otherwise, if this compact UE capability message is not successfully received at the base station, the UE then continues to iteratively generate compacted UE capability messages of successively smaller and smaller subsets of the default set of CA capabilities (and thus of smaller and smaller sizes) until either the base station successively receives a compact UE capability message or until a second threshold number ($Y>=1$) of transmission attempt iterations of this compaction process have been performed. If the base station successively receives a compacted UE capability message, the UE identifies the corresponding cell as a problematic cell and adds the cell to the PC list, including adding information pertaining to the compacted subset of CA combinations that were included in the successfully-transmitted compacted UE capability message. Otherwise, if Y iterations (including the initial iteration using either the problematic cell information or the network-specific information) have been attempted and the base station has not successfully received a compacted UE capability message, the UE disables carrier aggregation and attempts to connect to the base station using a UE capability message that does not contain any CA capability information.

Using this approach, a UE can iteratively reduce the CA combinations referenced in successive transmitted UE capability messages until either the base station is able to receive a compacted UE capability message, or until X+Y total unsuccessful attempts to transmit a UE capability message have been made. As such, the UE can effectively "tune" the size of the UE capability message to provide a UE capability message that can be received and processed successfully by the base station in many situations, and thus avoid the need to instead turn to a lower-performance RAT. Problematic cells may thus be compensated for during the connection process. Moreover, the non-access stratum (NAS) layer of the cellular protocol often will impose a significant back-off period (e.g., 12 minutes in some implementations) after a third threshold number (Z>1) of releases of the UE by the base station have been made in a row (the UE is barred from attempting to connect for a significant time period. Thus, the values of X and Y can be selected given the value of Z to minimize or avoid the risk of Z unsuccessful attempts being made and then triggering the UE from being barred from attempting to connect for a significant time period. For example, the UE can be configured to bar further attempts to connect to the base station after a third threshold number of releases Z of the UE by the base station in a row. The sum of X and Y can be less than or equal to Z.

For ease of illustration, processes of the present disclosure are described below in the example context of the 4G/5G Radio Resource Control (RRC) message exchange process for UE capability advertisement. However, these processes are equally adaptable to other UE capability advertisement protocols. Accordingly, reference to UECapabilityEnquiry RRC messages and UECapabilityInformation RRC messages shall equally apply to other equivalent UE capability enquiry messages and UE capability messages, respectively, unless otherwise noted.

Figure 1:
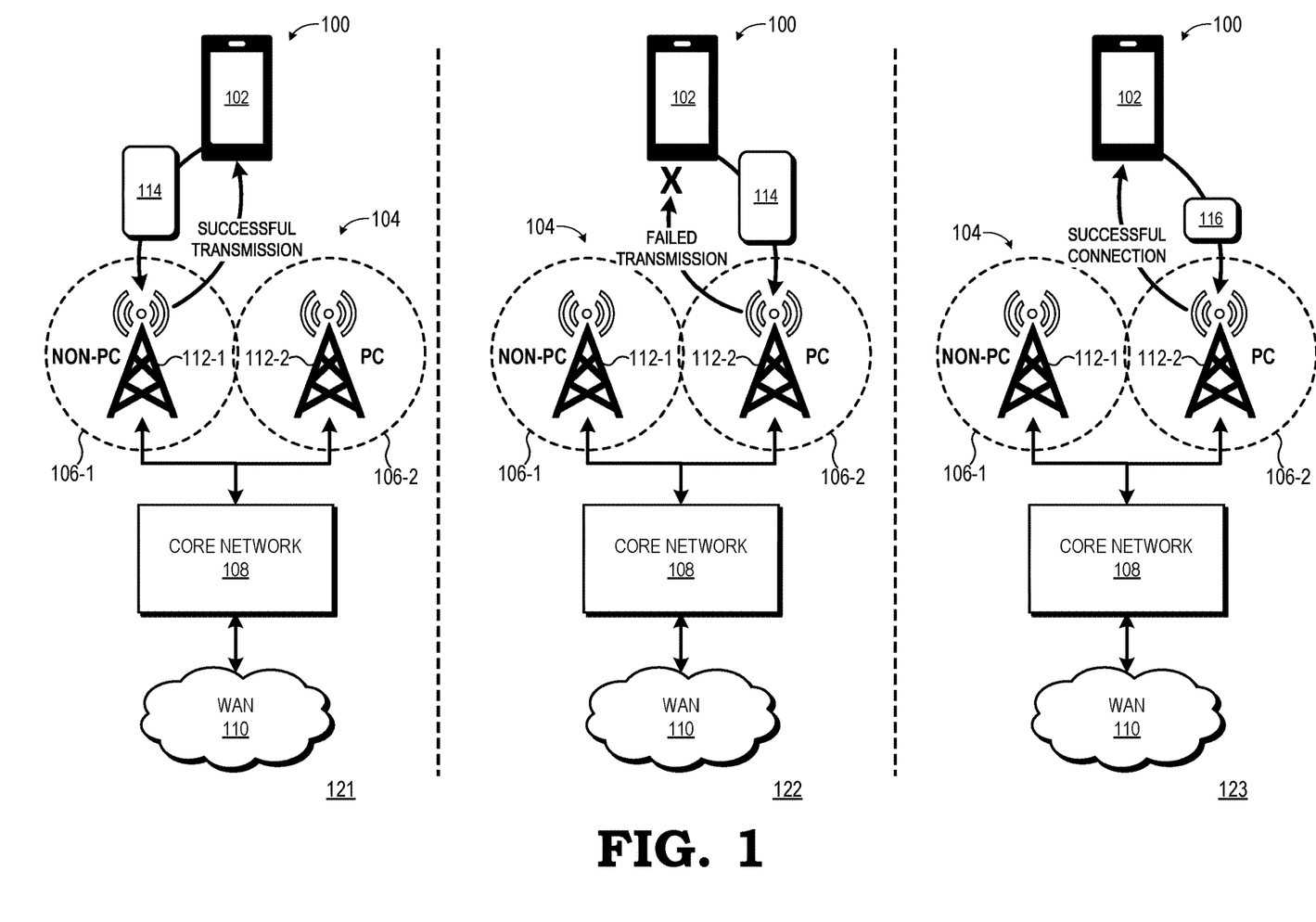
FIG. 1 is a block diagram of a cellular network having a UE employing an adaptive UE capability message compaction process in accordance with some embodiments.

FIG. 1 illustrates three example scenarios in a mobile cellular system 100 utilizing adaptive UE capability message compaction to compensate for problematic cells in accordance with some embodiments. As shown, the mobile cellular system 100 includes a user equipment (UE) 102 and a network 104, wherein the UE 102 and network 104 are configured to communicate using one or more radio access technologies (RATs), such as 4G LTE or 5G NR RATs. The UE 102 can include any of a variety of wireless communication devices, such as a cellular phone, a cellular-enabled tablet computer or cellular-enabled notebook computer, an automobile or other vehicle employing cellular services (e.g., for navigation, provision of entertainment services, in-vehicle mobile hotspots, etc.), and the like.

The network 104 includes a plurality of cells 106, including the illustrated cells 106-1 and 106-2, connected to a core network 108, which in turn is connected to one or more wide area networks (WANs) 110, such as the Internet. Each cell 106 includes a base station 112, such as base station 112-1 for cell 106-1 and base station 112-2 for cell 106-2. In implementations in which a cell implements a 5G NR protocol, the base station typically is referred to as a "5G NodeB" or "gNB", whereas when a cell implements a 4G LTE protocol, the corresponding base station typically is referred to as an "extended NodeB" or "eNB".

As a general operational overview, the UE 102 selects a cell 106 of the network 104 to camp on using any of a variety of well-known selection processes. As part of the initial registration process, the base station 112 of the selected cell 106 (that is, the "serving cell") and UE 102 perform a capability transfer process so that the UE can advertise its pertinent capabilities to the base station 112, which capabilities are in turn used by the base station 112 to establish an air interface between the UE 102 and the base station 112 for wireless signaling of uplink (UL) and downlink (DL) radio frequency (RF) signaling representing the transfer of control and data information. To illustrate, in the 4G LTE and 5G NR protocols, the capability transfer process is performed as an exchange of RRC messages using the RRC protocol at Layer 3 of the cellular protocol stack. First, a base station transmits a UECapabilityEnquiry RRC message to a UE, in response to which the UE generates and transmits a UECapabilityInformation RRC message (an example of a "capability message") that contains pertinent UE capabilities. If the base station is able to receive and process the UECapabilityInformation RRC message, the base station extracts the UE capability information and establishes the air interface accordingly. The base station then sends a Hybrid Automatic Repeat Request (HARQ) acknowledgment (ACK) signal to confirm the successful receipt of the UECapabilityInformation RRC message at the base station. However, if the base station 112 is unable to fully receive and process the UECapabilityInformation RRC message, either because it is too large for the base station or because the UL channel conditions are poor and thus the transmission of the UECapabilityInformation RRC message times-out based on a specified time-out timer, the base station 112 releases the UE. The UE then can either reattempt another iteration of this capability transfer process or elect to utilize a different lower-performance RAT to establish a connection with the network.

In at least one embodiment, the UE 102 and the network 104 are configured to support carrier aggregation (CA). As such, the UE capabilities signaled by the UE 102 in the UECapabilityInformation RRC message include information representing CA combinations (that is, aggregate combinations of component carriers) supported by the UE 102. As noted above, 4G LTE permits CA combinations of up to 5 component carriers and 5G NR permits CA combinations of up to 16 component carriers, which means that there are thousands of CA combinations that the UE 102 may be capable of supporting. Accordingly, including the information identifying each CA combination of the numerous CA combinations the UE 102 is capable of supporting can cause the size of the UECapabilityInformation RRC message to swell, often up to tens of kilobytes. The base station 112 of a cell 106 to which the UE 102 is attempting to connect may not be capable of receiving and fully processing an RRC message of this size, or the time needed to transmit the UECapabilityInformation RRC message of this size may exceed the time-out limit implemented for transmission of such messages due to poor UL channel conditions.

To illustrate, as shown by view 121 of FIG. 1, the cell 106-1 is considered a "non-problematic cell" or "non-PC" in that the UE 102 can transmit a default UECapabilityInformation RRC message 114 containing information representing a default set of CA combinations supported by the UE 102 and which the base station 112-1 of the cell 106-1 can fully receive and process correctly without triggering the base station 112-1 to release the UE 102; that is, the default UECapabilityInformation RRC message 114 can be "successfully transmitted" to the base station 112-1 of the non-PC cell 106-1. The default UECapabilityInformation RRC message 114 typically includes most or the entirety of the set of CA combinations that can be supported by the UE 102, or a subset of the set of CA combinations filtered based on known CA capabilities of the MNO or MCC associated with the network 104. In this normal capability mode, the UE can transmit a capability message representing the set of CA combinations to the base station.

However, as shown in view 122 of FIG. 1, the cell 106-2 is considered a "problematic cell" or "PC" in that the UE 102 is unable to successfully transmit the default UECapabilityInformation RRC message 114, either because the base station 112-2 of the cell 106-2 is incapable of processing an RRC message of its size, or because the size of the UECapabilityInformation RRC message 114 cannot be transmitted within the specified time window due to poor UL channel conditions between the UE 102 and the base station 112-2. Accordingly, repeated attempts by the UE 102 to transmit the default UECapabilityInformation RRC message 114 can result in a delayed connection (due to the typical 10-second wait period between each attempt) or, if the threshold number of failed transmissions are connected, can result in the NAS protocol of the UE 102 barring the UE 102 from making any further connection attempts for a relatively long period of time.

Accordingly, rather than continue to attempt to transmit the default UECapabilityInformation RRC message 114 to the problem cell 106-2, in at least one embodiment the UE 102 employs an adaptive UE capability message compaction process that iteratively generates smaller and smaller, or more and more compacted, UECapabilityInformation RRC messages 116, as illustrated in view 123, by iteratively reducing the CA combinations represented as supported in the compacted UECapabilityInformation RRC messages 116 until either a compacted UECapabilityInformation RRC message 116 of sufficiently small size is generated and successfully transmitted to the base station 112-2 of the problem cell 106-2, as shown in view 123, or until a threshold number of compaction/transmission iterations have been made, at which point the UE 102 can switch to a different RAT or attempt a connection without CA capabilities. Note that the heights of the boxes for the UECapabilityInformation RRC messages 114 and 116 in FIG. 1 are suggestive of the corresponding sizes of these messages relative to each other.

In this way, the UE can, in a normal capability mode, attempt to transmit capability messages representing a set of CA combinations from the UE to a base station (of a serving cell of a cellular network) until a first threshold number of unsuccessful attempts to transmit a capability message have been performed. The UE can enter a compact capability mode responsive to the first threshold number of unsuccessful attempts having been performed. In the compact capability mode, the UE can attempt to transmit capability messages representing successively smaller subsets of the set of CA combinations until either a capability message is successfully received by the base station or a second threshold number of unsuccessful attempts to transmit a capability message has been performed. An example implementation of the adaptive UE capability message compaction process is described subsequently with reference to FIG. 3.

Figure 2:
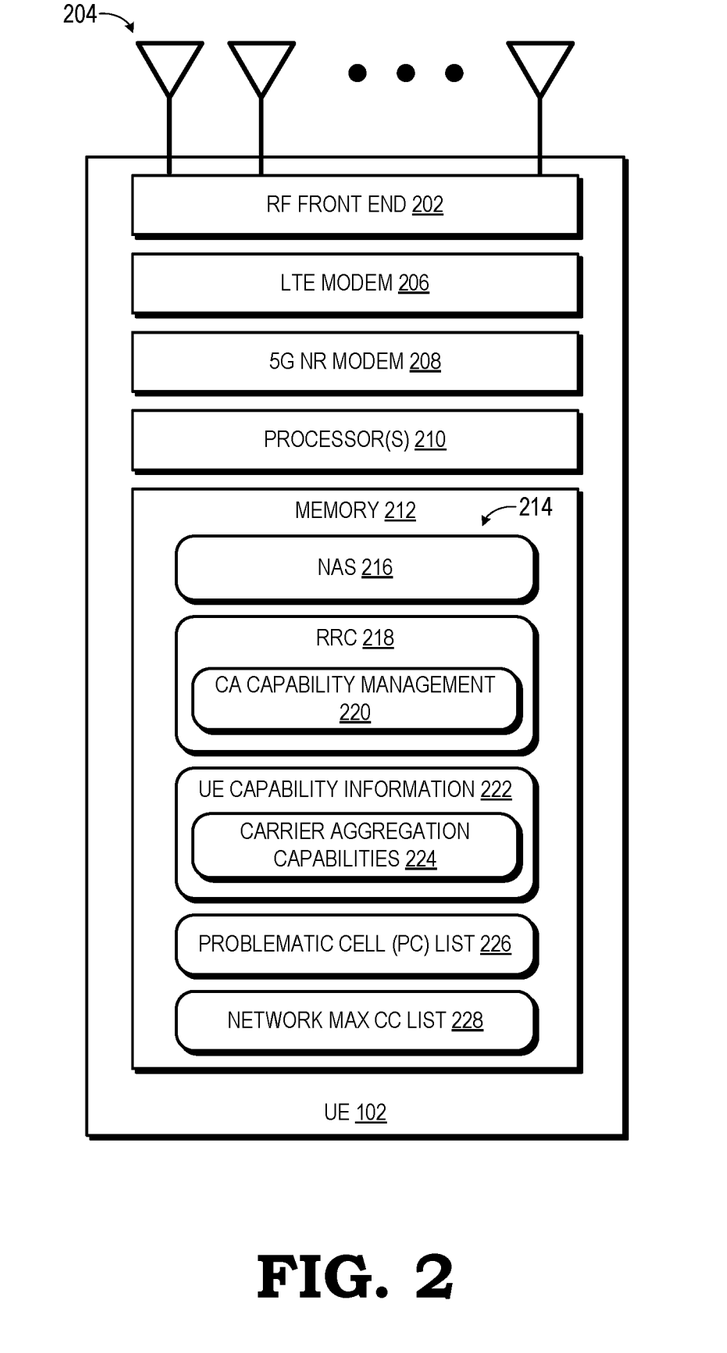
FIG. 2 is a block diagram of a hardware configuration of a UE in accordance with some embodiments.

FIG. 2 illustrates an example hardware configuration of the UE 102 in accordance with some embodiments. As shown, the UE 102 includes an RF front end 202 including one or more antenna arrays 204 and one or more transceivers for converting digital information to RF signaling and for converting RF signaling to digital information. The UE 102 further includes one or more modems for controlling the RF front end 202, such as an LTE modem 206 and a 5G NR modem 208, one or more processors 210, and one or more memories 212 or other non-transitory storage components. The illustrated one or more processors 210 can include, for example, an application processor and further may represent one or more modem processors of the modems 206 and 208. Likewise, the illustrated one or more memories 212 can include a system memory for the UE 102, as well as one or more local memories utilized by the modems 206 and 208 or other components of the UE 102. Further, it will be appreciated that the UE 102 can include additional components omitted from FIG. 2 for ease of illustration, including, for example, one or more displays, one or more touchscreens, keypads, mice, touchpads, microphones, speakers, and other user input/output devices, one or more sensors, batteries or other power sources, graphical processing units (GPUs) or other coprocessors, and the like.

As a general operational overview, the one or more processors 210 execute instructions of a software stack stored in the one or more memories 212 and which includes an operating system (OS) (not shown) executed by an application processor, one or more user software applications (not shown) executed by an application processor, and one or more cellular protocol stacks 214 executed at least in part by modem processors of the modems 206 and 208, such as a 4G LTE protocol stack implemented by the LTE modem 206 and a 5G NR protocol stack implemented by the 5G NR modem 208. The cellular protocol stack 214 includes a number of protocol layers, including a non-access stratum (NAS) protocol 216 responsible for formatting and control of messaging between the UE and the core network of a network (e.g., the core network 108 of network 104, FIG. 1) and a Radio Resource Control (RRC) protocol 218 that manages connection establishment and release functions, broadcast of system information, radio bearer establishment, reconfiguration and release, RRC connection mobility procedures, and the like. In one embodiment, the RRC protocol 218 includes a CA capability management module 220 configured to implement capability transfer for the UE 102, and more particularly, the adaptive UE capability message compaction process as described herein. In other embodiments, the CA capability management module 220 is partially or fully implemented at a different layer of the cellular protocol stack 214.

During performance of the adaptive UE capability message compaction process, the CA capability management module 220 utilizes various information stored in one or more memories 212 and which pertain to the UE 102 or the network 104. This includes UE capability information 222 that represents the current capabilities of the UE 102, including CA capability information 224 that represents the set of the CA combinations currently supported by the UE 102. Typically, the set of CA combinations supported by UE 102 is determined by the hardware capabilities of the UE 102, and thus is, in effect, a superset with the largest scope. As described herein, in some embodiments, rather than use the complete set of all possible supported CA combinations as "the set of CA combinations", the UE 102 instead uses a default set of CA combinations filtered from the entirety of supported CA combinations based on CA capabilities associated with the PLMN ID of the serving cell (where the PLMN ID typically is composed of a combination of mobile country code (MCC) and mobile network code (MNC) as the "set of CA combinations". These CA combinations typically are represented as CA descriptors or CA configurations that reference certain bandwidth (BW) classes and the number of component carriers in each class, such as CA descriptor CA_1C-5A representing two contiguous component carriers in band 1 and one component carrier in band 5, for a CA combination having 3 component carriers total. As such, the CA capability information 224 can be implemented as a list or other data structure containing the CA descriptors or other identifiers of the CA combinations supported by the UE 102.

The information utilized by the CA capability management module 220 further includes a PC list 226 that lists cells in one or more networks that were previously identified by the UE 102 or other network entity as problematic cells that were incapable of successfully receiving and processing UE capability messages containing information representing a default set of the CA combinations supported by the UE 102 (a list of one or more cells of one or more networks that previously were identified as unable to successfully receive a capability message of a default size). The PC list 226 further includes relevant information for each identified problematic cell, including a representation of a limited subset of CA combinations previously established for the problematic cell. To illustrate, Table 1 below depicts an example configuration of the PC list 226:

TABLE 1

PC LIST

| PLMN ID | Cell ID | max_CC_num | specific_CA_subset |
|---------|---------|------------|--------------------|
| 124724  | 0021    | 4          | 1A-3A, 1A-42A-42C, . . . |
| 387652  | 2011    | 10         | 3A-3A-20A, 5A-66A-66C |
| 874581  | 1002    | 3          | [Index 4]          |
| . . .   | . . .   | . . .      | . . .              |

As illustrated by Table 1, each entry of the PC list 226 includes a network identifier (such as PLMN ID) of the network 104 and a cell identifier, which together uniquely identify a given cell. Each entry further includes one or both of a max_CC_num value or a specific_CA_subset field. The max_CC_num value identifies the maximum number of component carriers that can be implemented in a CA combination represented in a compacted UECapabilityInformation RRC message transmitted to the base station 112 of the corresponding problematic cell. In other words, the max_CC_num represents a maximum number of component carriers that can be present in any CA combination included in the limited subset of CA combinations sent to the corresponding problematic cell. For example, although 5G NR permits up to 16 component carriers to be aggregated in a CA combination, when sending a compacted UECapabilityInformation RRC message to the problematic cell identified by PLMN ID 387652 and Cell ID 2011, the UE 102 is limited to including only those CA combinations with 10 or fewer aggregated component carriers (to reduce the size of the compacted UECapabilityInformation RRC message). Instead of, or in addition to, limiting the maximum number of aggregated component carriers to reduce the size of the compacted UECapabilityInformation RRC message, the UE 102 instead can include only a specified subset of the default set of CA combinations, with the specified subset identified in the specific_CA_subset field, either as a limited sublist that identifies each CA combination to include in the limited subset, as represented by entries 1 and 2 of Table 1, or as an index value that is used to index an entry of a separate table that contains different subsets of CA combinations supported by the UE 102. The list 226 thus contains an associated representation of a limited subset of CA combinations for each cell listed.

The information utilized by the CA capability management module 220 further can include a network maximum CC list 228, an example configuration of which is illustrated by Table 2 below:

TABLE 2

NETWORK MAXIMUM CC LIST

| PLMN ID | max_CC_num_plmn | specific_CA_subset |
|---------|------------------|--------------------|
| 124724  | 4                | 1A-3A, 1A-42A-42C, . . . |
| 387652  | 10               | 3A-3A-20A, 5A-66A-66C |
| 874581  | 3                | [Index 4]          |
| 988181  | 16               | [NULL]             |
| . . .   | . . .            | . . .              |

As shown, each entry of the network maximum CC list 228 corresponds to a network (identified by, for example, PLMN ID) and specifies one or both of: the maximum number of component carriers that can be implemented in a CA combination advertised by the UE 102 to the network (max_CC_num_plmn) or a specific subset of the default set of CA combinations for the corresponding network as similarly described above. Note that unlike the PC list 226, the network maximum CC list 228 is granular at the network level (or MCC level), rather than at the specific cell level. The list 228 thus identifies one or more networks and an associated representation of a limited subset of CA combinations for each network.

Figure 3:
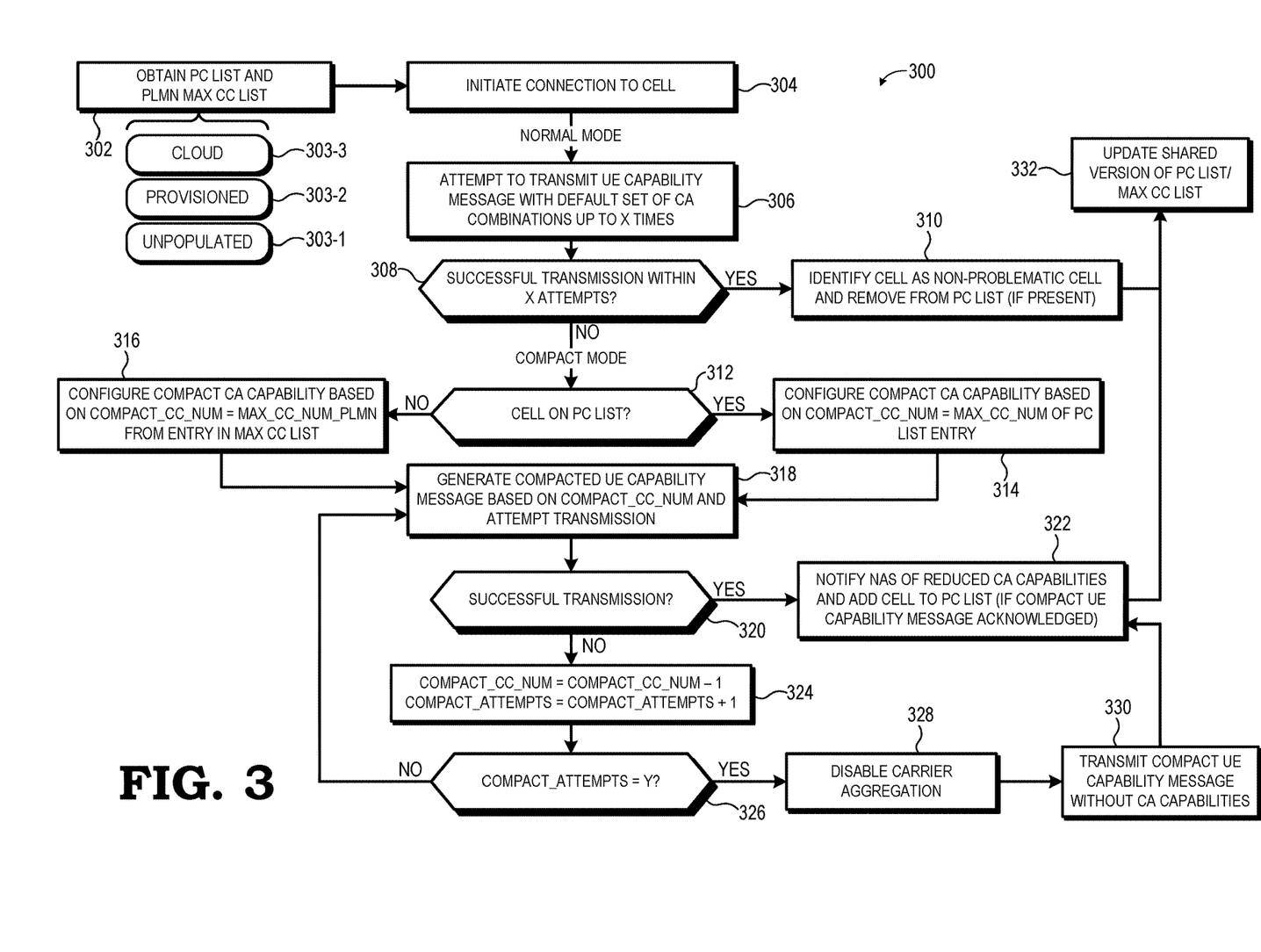
FIG. 3 is a flow diagram illustrating a method for adaptive UE capability message compaction at a UE in accordance with some embodiments.

FIG. 3 illustrates an example method 300 representing the adaptive UE capability information compaction process implemented by the UE 102 in accordance with some embodiments. For ease of reference, the method 300 is described with reference to the hardware configuration of the UE 102 depicted in FIG. 2. The method 300 begins at block 302 with the configuration of the UE 102, which includes obtaining initial versions of the PC list 226 and the network maximum CC list 228. As represented by block 303-1, in some embodiments one or both of these lists are unpopulated at the start and are built up entry-by-entry as the UE 102 interacts with cells on one or more networks. As represented by block 303-2, in other embodiments one or both of these lists are at least initially populated at the time of provisioning of the UE 102 by a corresponding MNO. Still further, as represented by block 303-3, in some embodiments initial versions of one or both of these lists are obtained from a remote server (that is, "from the cloud"), such as from a remote server in the WAN 110 (FIG. 1). To illustrate, an MNO provisioning the UE 102 may have developed a database of correspondences between PLMNs or MCCs and the maximum number of component carriers that can be implemented in CA combinations, prepared a version of the network maximum CC list 228 based on this information and stored a copy of this version of the network maximum CC list 228 in the memory 212 when provisioning the UE 102. As another example, a server on the Internet or otherwise accessible to the core network 108 may be used to store and serve a dynamically-updated version of the PC list 226. The UE 102 can access and store a current copy of the PC list 226 in response to a boot-up event, a periodic trigger, or another trigger, and as the UE 102 makes updates to the local copy of the PC list 226, the UE 102 can communicate the updates back to the server, whereupon the changes indicated by the UE 102 can be propagated to other UEs such that the identification and documentation of problem cells are effectively tasked to any number of UEs.

At block 304, the UE 102 identifies a serving cell 106 to camp on and initiates an attempt to connect to the identified cell. This connection attempt triggers the base station 112 of that serving cell 106 to transmit a UECapabilityEnquiry RRC message to the UE 102. In response to this message, the CA capability management module 220 enters a normal capability mode. In this mode, at block 306 the CA capability management module 220 utilizes the CA capability information 224 to identify a default set of CA combinations, generates a default UECapabilityInformation RRC message that represents the identified default set of CA combinations, and the UE 102 repeatedly attempts to transmit the default UECapabilityInformation RRC message until either the default UECapabilityInformation RRC message is successfully received by the base station 112 of the serving cell 106 or a threshold number X of attempts are made to transmit the default UECapabilityInformation RRC message. In some embodiments, successful receipt of the default UECapabilityInformation RRC message is indicated by, for example, receipt of a HARQ ACK signal from the base station 112 indicating that the default UECapabilityInformation RRC message was received and fully processed by the base station 112.

The default set of CA combinations can include the entirety of the set of CA combinations supported by the UE 102, or some filtered subset. To illustrate, in some embodiments, an MNO or other network entity may determine that the cells associated with a certain cellular carrier or that the networks associated with a particular MCC typically support only up to a certain number of component carriers in any available CA combination. Using this information, the CA capability management module 220 can identify the cellular carrier or MCC associated with the camped-on cell 106 and remove all of the CA combinations that have more component carriers than the identified maximum number of component carriers for the identified cellular carrier or MCC so that the default set of CA combinations does not include any CA combinations that are known to be incompatible with the network 104, and thus providing for a smaller default set of CA combinations. Bandwidth usage may therefore be reduced during the connection.

At block 308, the CA capability management module 220 determines whether the default UECapabilityInformation RRC message was successfully transmitted to the base station 112 within X attempts. If so, at block 310 the CA capability management module 220 identifies the serving cell 106 as currently a non-problematic cell. As such, the CA capability management module 220 checks the PC list 226 to determine if the serving cell 106 was previously identified as a problematic cell and if so, clears or removes the entry of the PC list 226 associated with the now non-problematic serving cell 106.

Otherwise, if the default UECapabilityInformation RRC message was not successfully transmitted to the base station 112 within X attempts, the CA capability management module 220 enters a compact capability mode in which the UE 102 iteratively attempts to transmit successively more compacted UECapabilityInformation RRC messages until a compacted UECapabilityInformation RRC message is successfully transmitted to the base station 112 or until a threshold number Y transmission attempts are made. Thus, at block 312 the CA capability management module 220 determines whether the cell 106 is on the PC list 226, and thus has already been identified as a problematic cell. If so, at block 314 the CA capability management module 220 determines an initial compact maximum number of component carriers in CA combinations (compact_CC_num) of a compact subset of CA combinations based on the maximum number of component carriers in a CA combination identified in the max_CC_num field of the cell's entry in the PC list 226; that is, sets compact_CC_num=max_CC_num. To illustrate, if the PC list 226 indicates that the max_CC_num for the cell 106 is 6, then the initial maximum number of component carriers permitted in a CA combination that is to be included in the compacted CA capability is set to 6. Alternatively, if a specific subset of CA combinations is listed in the specific_CA_subset field of the corresponding entry of the PC list 226, the CA capability management module 220 determines a compact subset of CA combinations to include this specific subset. In this way, the UE can configure an initial capability message for transmission in the compact capability mode to represent a subset of the set of CA combinations based on the representation of the limited subset of CA combinations associated with the serving cell.

Otherwise, if the cell is not on the PC list 226 and thus the cell has not recently been identified as a problematic cell, then at block 316 the CA capability management module 220 instead turns to the network maximum CC list 228 to determine the max_CC_num_plmn for the network 104 or MCC associated with the cell 106 and sets compact_CC_num equal to max_CC_num_plmn from the entry of the network maximum CC list 228 associated with the network 104. In this way, the UE can configure an initial capability message for transmission in the compact capability mode to represent a subset of the set of CA combinations based on the representation of the limited subset of CA combinations associated with the network. In the event that the cell 106 is associated with a network not listed on the network maximum CC list 228, then in one embodiment the capability management module 228 sets compact_CC_num equal to one less than that maximum number of carrier components present in the default set of CA combinations used in the normal mode.

At block 318, the CA capability management module 220 generates (or configures) a compacted UECapabilityInformation RRC message (an initial capability message) that includes a filtered, or limited, subset of the default set of CA combinations and attempts to transmit the compacted UECapabilityInformation RRC message to the base station 112 of the serving cell 106. In at least one embodiment, the filtered subset of the default set of CA combinations is generated by removing any CA combination in the default set that includes a number of component carriers that is greater than the initial value of compact_CC_num set at either block 314 or 316. To illustrate, if compact_CC_num is initially set to 4 component carriers, then any CA combination in the default set having 5 or more component carriers is omitted from the filtered subset of CA combinations included in the compacted UECapabilityInformation RRC message. By filtering the CA combination set in this manner, the overall size of the compacted UECapabilityInformation RRC message generated to include the filtered subset is reduced compared to the size of the default UECapabilityInformation RRC message that includes the default set of CA combinations, and thus is more likely to be successfully transmitted to the base station 112.

At block 320, the CA capability management module 220 determines whether the compacted UECapabilityInformation RRC message generated at block 318 was successfully transmitted to the base station 112. If so, then CA capability management module 220 has confirmed that the base station 112 cannot receive the default UECapabilityInformation RRC message with the default set of CA combinations but can receive a compacted UECapabilityInformation RRC message with the current limited subset of CA combinations. As such, at block 322 the CA capability management module 220 notifies the NAS protocol 216 of the reduced CA capabilities being implemented for an air interface established between the base station 112 and the UE 102 based on the compacted UECapabilityInformation RRC message. Typically, a base station, such as the base station 112, only seeks capability information from a UE when the UE initially attaches to the base station or moves across a pre-defined boundary area. As a result, the UE in this situation may be limited to using a relatively small allocation of carrier components for a relatively long time. However, a problematic cell often is individually problematic; that is, the nearby cells often are non-problematic. Accordingly, to facilitate faster recovery of optimal CA capabilities, in some embodiments whenever the UE 102 subsequently camps on another cell other than the current problematic cell, the NAS protocol 218 of the UE 102 is configured to trigger the transmission of a location area update (LAU) message that includes a flag that triggers the receiving base station to reinitiate the UE capability inquiry process so that the UE 102 is not stuck with the same CA configuration implemented when attached to the current problematic cell.

Further at block 322, The CA capability management module 220 also identifies the cell 106 as a problematic cell as a result of its ability to receive only a compacted subset of CA capabilities, and thus adds the cell 106 to the PC list 226, setting the max_CC_num field to the current value of compact_CC_num.

Otherwise, if at block 320 the CA capability management module 220 determines that the transmission of the initial compacted UECapabilityInformation RRC message was unsuccessful, then the CA capability management module 220 prepares to transmit a further-compacted UECapabilityInformation RRC message. Accordingly, at block 324 the CA capability management module 220 (iteratively) reduces the current value of compact_CC_num by one or some other specified value K (that is, compact_CC_num=compact_CC_num−1 or, more generally, =compact_CC_num−K, K being an integer greater than or equal to 1) and increments an attempt counter compact_attempts by one (that is, compact_attempts=compact_attempts+1) to reflect the most recent failed attempt to transmit a compacted UECapabilityInformation RRC message.

At block 326, the CA capability management module 220 determines whether the threshold number of transmissions of a compacted UECapabilityInformation RRC message has been unsuccessfully attempted (that is, whether compact_attempts=Y). If not, the method 300 then returns to block 318 whereupon the CA capability management module 220 generates another compacted UECapabilityInformation RRC message that includes a further filtered subset of the default set of CA combinations that excludes all CA combinations that have a number of component carriers greater than the current value of compact_CC_num and performs another iteration of the transmission attempt and evaluation process represented by blocks 318, 320, 322, 324, and 326. In this way, the UE can attempt to transmit capability messages representing successively smaller subsets of the set of CA combinations to the base station while in the compact capability mode. This transmission attempt and evaluation process is repeated for an increasingly more compacted UECapabilityInformation RRC message at each iteration (due to the decrease in compact_CC_num at each iteration and thus the exclusion of increasingly greater numbers of CA combinations from the filtered subset included in the compacted UECapabilityInformation RRC message) until one of the iterations results in a compacted UECapabilityInformation RRC message that is sufficiently small to be successfully received by the base station of the cell or until the threshold number Y of compact transmission attempts has been performed.

If the CA capability management module 220 detects at an iteration of block 326 that the threshold number Y of compact attempts has been performed, then the CA capability management module 220 ceases to attempt to establish a connection with the base station 112 that includes CA capability, and instead at block 328 disables carrier aggregation at the UE 102 and at block 330 generates and transmits a UECapabilityInformation RRC message that does not advertise any CA capabilities in an attempt to transmit a relatively small UECapabilityInformation RRC message that should be received and successfully processed by the base station 112, though at the expense of loss of CA capability but while maintaining the ability to use the higher-performance RAT provided by an air interface with the cell 106. Thereafter, the method 300 flows to block 322 with the CA capability management module 220 notifying the NAS protocol 216 of the elimination of CA capabilities for an air interface established between the base station 112 and the UE 102.

As noted above, in some embodiments the UE 102 utilizes a PC list 226 that was originally populated by problematic cell information obtained from a shared resource, such as a shared PC list stored at a remote server and updated by multiple UEs. In such instances, at block 332 the UE 102 can transmit any updates to its local copy of the PC list 226 to the remote server, including additions of newly-encountered problematic cells and removals of previously-problematic cells that are no longer behaving like problematic cells, and these updates can be propagated to other UEs. The transmission of updates can be performed each time a change is made to the PC list 226, in response to a periodic trigger or in response to a threshold number of changes made, and the like. An initial version of the network maximum CC list 228 likewise can be populated from a shared resource at a remote server and updated in a similar manner.

As method 300 illustrates, the CA capability management module 220 makes up to X attempts to transmit a default UECapabilityInformation RRC message for successful reception by the base station 112 (that is, does not trigger a subsequent release of the UE 102 by the base station 112) during a normal capability mode. If successful, the associated cell is removed from the PC list 226 if the cell 106 was on the PC list 226. If the X attempts are unsuccessful, the CA capability management module 220 enters a compact capability mode and makes up to Y+1 attempts to obtain a successful transmission of UECapabilityInformation RRC message by successively reducing the number of CA combinations represented in the UE capability information of each message for each successive attempt. In the example described above, the reduction, or filtering, of CA combinations to greater and greater extents for each attempt is achieved by reducing the maximum number of component carriers that can be represented in an included CA combination for each iteration. For example, attempting to transmit capability messages representing successively smaller subsets of the set of CA combinations can comprise, for each successive capability message, successively reducing a maximum number of component carriers that can be present in any CA combination included in a subset of CA combinations represented in the capability message. However, as noted above, the PC list 226 and network maximum CC list 228 can instead identify a specific subset of CA combinations to start with, and each iteration can further reduce the number of CA combinations included from this specific subset by increasingly aggressive filtering (e.g., removing 20% of CA combinations from the specific subset on the first iteration, 40% of CA combinations on the next iteration, and so forth). For example, attempting to transmit capability messages representing successively smaller subsets of a set of CA combinations can comprise identifying an initial subset of the set of CA combinations and, for each successive capability message, successively reducing a number of CA combinations from the initial subset that are represented in the capability message.

The method 300 provides for up to X+Y+1 attempts at successfully transmitting a UECapabilityInformation RRC message to the base station 112, including up to X attempts at transmitting the default UECapabilityInformation RRC message during a normal capability mode and failing that, up to Y attempts at transmitting increasingly more compacted UECapabilityInformation RRC messages during a compact capability mode, and failing that, one last transmission of a UECapabilityInformation RRC message that does not contain any CA capabilities. Consistent with several cellular protocols, the NAS protocol 216 typically will permit up to Z releases by a base station in a row before the NAS protocol 216 will bar the UE 102 from attempting to connect with the base station again for a significant duration. For example, the 4G LTE and 5G NR specifications provide that a NAS is to bar a UE from attempting to connect to a base station for 12 minutes following 5 releases in a row by the base station. Accordingly, to avoid triggering such a connection bar by the NAS protocol 216, the values of X and Y can be set relative to Z based on the expression: X+Y+1<=Z. Thus, assuming Z=5 for a 4G LTE or 5G NR configuration, setting X to 2 will allow a second attempt to transmit the default UECapabilityInformation RRC message, and then permit the UE 102 to attempt to transmit up to two successively smaller UECapabilityInformation RRC messages before having to fall back to attempting to establish a connection with the base station that foregoes utilizing carrier aggregation. Similarly, setting X to 1 will allow one attempt to transmit the default UECapabilityInformation RRC message, and then permit the UE 102 to attempt to transmit up to three successively smaller UECapabilityInformation RRC messages before having to fall back to attempting to establish a connection with the base station that foregoes utilizing carrier aggregation.

In some embodiments, certain aspects of the techniques described above may be implemented by one or more processors of a processing system executing software (or a computer program). The software comprises one or more sets of executable instructions stored or otherwise tangibly embodied on a non-transitory computer-readable storage medium. The software/computer program can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for capability transfer by a user equipment (UE) in a cellular network, the method comprising:
   in a first mode, attempting to transmit capability messages representing successively smaller subsets of a set of carrier aggregation (CA) combinations from the UE to a base station of a serving cell of the cellular network until either a capability message is successfully received by the base station or a first threshold number of unsuccessful attempts to transmit a capability message has been performed.

2. The method of claim 1, further comprising:
in a second mode prior to the first mode, attempting to transmit capability messages representing the set of CA combinations from the UE to the base station until a second threshold number of unsuccessful attempts to transmit a capability message have been performed; and
entering the first mode responsive to the second threshold number of unsuccessful attempts having been performed.

3. The method of claim 2, further comprising:
maintaining a first list of one or more cells of one or more networks that previously were identified as unable to successfully receive a capability message of a default size, wherein the first list contains an associated representation of a limited subset of CA combinations for each cell listed in the first list; and
wherein entering the first mode comprises:
responsive to determining that the serving cell is listed in the first list, configuring an initial capability message for transmission in the first mode to represent a subset of the set of CA combinations based on the representation of the limited subset of CA combinations associated with the serving cell in the first list.

4. The method of claim 3, further comprising:
maintaining a second list identifying one or more networks and an associated representation of a limited subset of CA combinations for each network listed in the second list; and
wherein entering the first mode further comprises:
responsive to determining that the serving cell is not listed in the first list and the cellular network is listed in the second list, configuring an initial capability message for transmission in the first mode to represent a subset of the set of CA combinations based on the representation of the limited subset of CA combinations associated with the network in the second list.

5. The method of claim 4, wherein entering the first mode further comprises:
responsive to determining that the serving cell is not listed in the first list and the cellular network is not listed in the second list, configuring an initial capability message for transmission in the first mode to represent a subset of the set of CA combinations that comprises only CA combinations with a maximum number of component carriers that is at least one less than a maximum number of component carriers present in capability messages transmitted in the second mode.

6. The method of claim 4, further comprising:
obtaining an initial version of the second list from a remote server; and
transmitting an update to the second list to the remote server responsive to determining a change in a number of CA combinations determined to be supported for the network.

7. The method of claim 3, wherein the representation of the limited subset of CA combinations for a cell listed in the first list comprises at least one of:
a maximum number of component carriers that can be present in any CA combination included in the limited subset; or
a specified list of CA combinations included in the limited subset.

8. The method of claim 3, further comprising:
responsive to a capability message being successfully transmitted to the base station while in the second mode, removing the serving cell from the first list.

9. The method of claim 8, further comprising:
obtaining an initial version of the first list from a remote server; and
sending an update to the first list to the remote server responsive to removing the serving cell from the first list.

10. The method of claim 3, further comprising:
obtaining an initial version of the first list from a remote server.

11. The method of claim 1, wherein the set of CA combinations comprises a default set of CA combinations supported by the UE.

12. The method of claim 11, wherein the default set of CA combinations comprises:
an entirety of the CA combinations supported by the UE; or a subset of the entirety of CA combinations supported by the UE that includes only those CA combinations identified as supportable based on a network operator of the cellular network or a mobile country code associated with the serving cell.

13. The method of claim 2, wherein:
the UE is configured to bar further attempts to connect to the base station after a third threshold number of releases of the UE by the base station in a row; and
a sum of the first threshold number and the second threshold number is less than or equal to the third threshold number.

14. The method of claim 2, further comprising:
responsive to performing the first threshold number of unsuccessful attempts to transmit a capability message, attempting to transmit a capability message that does not represent any CA combinations from the UE to the base station;
wherein the UE is configured to bar further attempts to connect to the base station after a third threshold number of releases of the UE by the base station in a row; and
wherein a sum of the first threshold number and the second threshold number is less than the third threshold number.

15. The method of claim 1, further comprising:
responsive to performing the first threshold number of unsuccessful attempts to transmit a capability message, attempting to transmit a capability message that does not represent any CA combinations from the UE to the base station.

16. The method of claim 1, wherein attempting to transmit capability messages representing successively smaller subsets of a set of CA combinations comprises:
for each successive capability message, successively reducing a maximum number of component carriers that can be present in any CA combination included in a subset of CA combinations represented in the capability message.

17. The method of claim 1, wherein attempting to transmit capability messages representing successively smaller subsets of a set of CA combinations comprises:
identifying an initial subset of the set of CA combinations; and
for each successive capability message, successively reducing a number of CA combinations from the initial subset that are represented in the capability message.

18. The method of claim 1, wherein the first mode is a compact capability mode.

19. A user equipment configured to perform the method of claim 1.

20. A method for capability transfer by a user equipment (UE) in a cellular network, the method comprising:
    maintaining, at the UE, a problematic cell list identifying one or more cells previously identified as failing to receive a capability message of a default size, the problematic cell list further identifying at least one of a corresponding maximum number of component carriers for each listed cell or a specific subset of carrier aggregation (CA) combinations; and
    responsive to determining that a base station of a serving cell is incapable of receiving a capability message representing a set of CA combinations supported by the UE:
        determining whether the serving cell is listed in the problematic cell list; and
        responsive to determining the serving cell is listed, attempting to transmit a capability message representing a subset of CA combinations from the UE to the serving cell, the subset of CA combinations composed of: only CA combinations from the set that have a number of component carriers not greater than the maximum number of component carriers identified in the problematic cell list for the serving cell; or the specific subset of CA combinations.

21. The method of claim 20, further comprising:
    responsive to determining that the base station of the serving cell is capable of receiving a capability message representing an entirety of the set of CA combinations and responsive to determining that the serving cell is listed in the problematic cell list, removing the serving cell from the problematic cell list.

22. The method of claim 21, further comprising:
    obtaining an initial version of the problematic cell list from a remote server; and
    transmitting an update to the problematic cell list to the remote server responsive to removing the serving cell from the problematic cell list.

23. A user equipment configured to perform the method of claim 20.

* * * * *